United States Patent
Erickson

(10) Patent No.: US 8,920,716 B2
(45) Date of Patent: Dec. 30, 2014

(54) IN-SITU ENCLOSED OR SEMI-ENCLOSED SPACE SANITATION AND DEODORIZATION

(76) Inventor: Gary Roy Erickson, Coonabarabran (AU)

( * ) Notice: Subject to any disclaimer, the term of this patent is extended or adjusted under 35 U.S.C. 154(b) by 1515 days.

(21) Appl. No.: 12/516,801

(22) PCT Filed: Dec. 7, 2006

(86) PCT No.: PCT/AU2006/001845
§ 371 (c)(1), (2), (4) Date: May 28, 2009

(87) PCT Pub. No.: WO2007/070922
PCT Pub. Date: Jun. 28, 2007

(65) Prior Publication Data
US 2010/0284855 A1    Nov. 11, 2010

(30) Foreign Application Priority Data
Dec. 21, 2005    (AU) ................. 2005907187

(51) Int. Cl.
| | | |
|---|---|---|
| A61L 9/00 | (2006.01) | |
| A62B 7/08 | (2006.01) | |
| A23L 3/358 | (2006.01) | |
| A23L 1/015 | (2006.01) | |
| A23L 3/3445 | (2006.01) | |
| A23L 3/3463 | (2006.01) | |
| A23L 3/3481 | (2006.01) | |
| A23L 3/37 | (2006.01) | |
| A23L 3/375 | (2006.01) | |
| F25D 17/04 | (2006.01) | |

(52) U.S. Cl.
CPC .............. *A23L 3/358* (2013.01); *A23L 1/0155* (2013.01); *A23L 3/3445* (2013.01); *A23L 3/3463* (2013.01); *A23L 3/3481* (2013.01); *A23L 3/37* (2013.01); *A23L 3/375* (2013.01); *F25D 17/042* (2013.01); *F25D 2317/0415* (2013.01)
USPC ...................... 422/28; 422/1; 422/5; 422/123

(58) Field of Classification Search
CPC ........... A61L 2/00; A61L 2/0094; A61L 2/06; A61L 2/208
USPC .................... 422/1, 5, 28, 32, 123–124, 292, 422/305–306; 134/39, 42; 510/191, 372, 510/500; 424/524; 252/60
See application file for complete search history.

(56) References Cited

U.S. PATENT DOCUMENTS

| | | | | |
|---|---|---|---|---|
| 4,863,688 | A | * | 9/1989 | Schmidt et al. ................. 422/28 |
| 5,792,422 | A | * | 8/1998 | Lin et al. .......................... 422/31 |
| 6,666,030 | B2 | * | 12/2003 | Furuta et al. ........................ 62/1 |
| 2003/0124026 | A1 | * | 7/2003 | Williams et al. ................ 422/33 |
| 2005/0053517 | A1 | * | 3/2005 | Finan et al. ..................... 422/31 |
| 2005/0235830 | A1 | * | 10/2005 | Hughes ........................... 96/108 |

* cited by examiner

*Primary Examiner* — Monzer R Chorbaji

(57) ABSTRACT

This patent discloses a novel and effective device and process, which combines the advantages of refrigeration in a synergistic manner with the advantages of hydrogen peroxide and other organic and inorganic peroxygen compounds, resulting in an enhanced ability to reduce and/or eliminate microbial activity and mitigate malodors. This device and process is suitable for the continuous in-situ sanitation and deodorization of enclosed or semi enclosed spaces, which may contain foodstuffs or other putresable items, which would be otherwise adversely affected by the activity of bacteria, mold, mildew or malodors. In particular this invention has application in environments such as refrigerators, cool rooms and freezers, where products are stored for the purpose of extending their shelf life and preventing damage by the activity of microorganisms.

13 Claims, 5 Drawing Sheets

51  52  53  54  55  56

IN-SITU ENCLOSED OR SEMI-ENCLOSED SPACE SANITATION AND DEODORIZATION

TECHNICAL FIELD

This patent discloses a novel and effective device and process, which combines the advantages of refrigeration in a synergistic manner with the advantages of hydrogen peroxide and other organic and inorganic peroxygen compounds, resulting in an enhanced ability to reduce and/or eliminate microbial activity and mitigate malodors.

This device and process is suitable for the continuous in-situ sanitation and deodorization of enclosed or semi enclosed spaces, which may contain foodstuffs or other putresable items, which would be otherwise adversely affected by the activity of bacteria, mould, mildew or malodors. In particular this invention has application in environments such as refrigerators, cool rooms and freezers, where products are stored for the purpose of extending their shelf life and preventing damage by the activity of microorganisms.

BACKGROUND ART

For clarity of communication the following discussion will refer to, peroxygen compounds but it will be understood that this term implies the use of either hydrogen peroxide, other peroxygen molecules, such as peracetic acid and longer chain peroxycarboxylic acids, other organic peroxides such as urea peroxide, and other organic and inorganic pre-curser chemicals for the in-situ creation of hydrogen peroxide such as sodium peroxide, benzyl peroxide and the like.

The universal reliance on techniques such as refrigeration, drying and the addition of preservative chemicals to foods highlights the need for effective and efficient methods to extend the length of time that foodstuffs can be stored safely and without risk to human consumption.

Ideally, it would be useful if a device and/or process could be found which utilized a readily available, naturally occurring, relatively non-toxic, non-aromatic and inexpensive chemical which would aid in the preservation of foods and extend their shelf life under normal storage conditions such as those found in refrigerators, cool rooms, freezers and other air conditioned spaces. It would also be ideal if the device/process of choice eliminated malodors and allowed the natural aromas of the foods to predominate. In addition it would also be advantageous for occupational health and safety reasons if the chemical and device used provided an environment, which is safe to work in without the need for additional safety equipment. Peroxygen compounds, appear to fit these requirements.

Peroxygen compounds have a well, accepted history of being excellent disinfectant and sterilization agents. In particular Ernest Barbieri (Swiss patent 715,765) teaches us that the conditioning of air in a sealed chamber containing fresh fruit and vegetables will extend their shelf life. Such conditioning entails the removal of ethylene oxide from the chamber, the disinfection of the air in the chamber by hydrogen peroxide and the control of temperature at a level appropriate for the food being preserved, unfortunately he does not disclose the temperatures of concern nor the concentration of hydrogen peroxide required for the treatment. See also, for example US Pat No US2004022907, which discloses the use of high concentrations of hydrogen peroxide vapor over a short period of time 15-30 seconds to treat Almonds, other nuts, grains, dried or dehydrated fruits or vegetables, and other agricultural foodstuffs moving along a conveyor. This treatment could be performed with peroxide vapor concentrations ranging from 0.1 to 10 mg/L of treatment air, at temperatures below 40 deg. C. Further, techniques for the preservation of foods, which have been reported, include the use of vaporous or liquid peroxides either directly as hydrogen peroxide or indirectly as organic or inorganic peroxy compounds see for example U.S. Pat. Nos. 5,200,189, 5,314, 687, 5,409,713, 5,437,868, 5,489,434, 6,674,538, 6,010,729, 6,111,963, and 6,514,556). These techniques are usually applied at temperatures of 20 deg. C.-80 deg. C. prior to the objects being stored in an air-conditioned, refrigerated or other suitable space, or transported for further processing or preservation.

It is well demonstrated in the art described above and elsewhere that the higher the temperature the greater the biocidal activity of peroxygen compounds in both liquid and vapor forms, and it has also been hitherto believed that at sufficiently low concentrations and temperatures the efficacy of peroxygen compounds is reduced to a level which is ineffective.

Some prior art exists for the chemical treatment of fresh produce at refrigeration temperatures, for example U.S. Pat. No. 6,666,030 'Ice Composition containing hydrogen peroxide and method for storing perishable foods', teaches how the very low vapor pressure of hydrogen peroxide ensures it remains in the ice for a longer period of time than more volatile oxidative chemicals such as ozone. This allows the peroxide/ice composition created by electrolytic means to be used for the effective storage of fresh fish, fruit and vegetables at or near 0° C. For this prior art to be effective it requires an ice composition of 50-500 mg/L of hydrogen peroxide to be in constant contact with the foods being preserved.

U.S. Pat. No. 5,460,845 'Peroxyacid Antimicrobial composition' teaches that particular synergistic combinations of peroxyacids form effective sanitizing solutions for the sanitizing of food processing equipment and clothing in the temperature range of 4-60° C. and in use liquid concentrations of peroxyacids in excess of 30 ppm. It also requires that the liquid formulations thus described make direct contact with the surfaces or products to be sanitized.

US Patent Application 2005/0089458 'Refrigeration Purifier' teaches the use of ozone produced by corona discharge dissolved in the water used in refrigeration systems, with offgasing of un-dissolved ozone within the refrigerated space decontaminating the air and non-wetted surfaces. The method of liquid decontamination is via the dissolution of ozone and subsequent formation of hydroxyl radicals and hydrogen peroxide produced by the reaction of ozone with water. Some difficulties associated with the use of ozone in this manner are the potential corrosion and occupational health and safety issues of high levels of ozone in cool rooms and the like.

US Patent Application 2004/0151812 'Method for Preserving Fresh Vegetables' discloses a method for packaging fresh foods under a controlled atmosphere containing initially high levels of carbon dioxide (or other anti-microbial gas or vapors), and subsequently allowing the level of carbon dioxide to fall below 20% of the atmosphere in the packaging by use of semi-permeable membranes and the like over a period of 1-7 days. The use of peroxide is mentioned in this document, but its method of application is not specified or described and as required by their claims, the generation vapor levels of peroxide equivalent to or greater than 20% of the atmosphere would pose a significant occupational health and safety hazard and potentially damage any produce stored under these conditions.

European Patent 1043273 'Hydrogen Peroxide Solution, Method of Using Said Hydrogen Peroxide Solution, and Method for Producing Said Hydrogen Peroxide Solution, teaches about a means for stabilizing high concentrations of hydrogen peroxide by the addition of polyalcohols and organic acids to the formulation. It also discloses a multitude of uses such as the disinfection of products or spaces by the direct application of an atomized solution onto the product or into the space to be disinfected. It also teaches that a significant amount of hydrogen peroxide is added to the product (0.1-1 g hydrogen peroxide per kg of product). At these levels the proposed use of treating the cooling air in bakeries and slaughterhouses would result in significant workplace hazards. The recommended safe limit (TLV-TWA 8 hours) in the workplace of hydrogen peroxide vapors is 1.4 mg/kg Air (1 ppm)

We disclose herein a device and method, which utilizes the advantages of refrigeration in a synergistic manner with the advantages of peroxygen compounds, with respect to their ability to reduce and/or eliminate microbial activity and mitigate malodors within the treated space. This device and method can use a chemical which is—naturally occurring and applies it at vapor levels significantly lower than previously thought useful, at such low vapor levels where the process is non hazardous to operators in the food handling and processing industries. The underlying basis of this invention is the drive towards equilibrium of peroxide vapor above a reservoir of bulk peroxygen compound. This drive produces a continuous supply of peroxygen compounds in the vapor state to react with microorganisms and malodorous chemicals within the treatment space, such organisms and chemicals remove the peroxygen compounds from the vapor state thereby allowing the release of further peroxygen vapors from the reservoir of the bulk solution. When the peroxygen compound is hydrogen peroxide, it has one additional advantage in that it spontaneously decomposes to water and oxygen in the vapor state in accordance with the following equation (1)

$$2H_2O_{2(l)} \lll 2H_2O_{(g)} + O_2 \quad (1)$$

Although this patent describes particular application of the process to the preservation of fresh food and vegetables, it would be appreciated, by anyone skilled in the art, that the techniques described herein are applicable to any enclosed or semi-enclosed space within which objects, which require a bacterial, mould and/or malodor free environment can be stored.

DISCLOSURE OF INVENTION

Technical Problem

Disadvantages of the Prior Art

Although refrigeration suitably slows the action of microorganisms it does not reduce their numbers nor does it remove the odors associated with their activity. The use of any pre refrigeration preservative techniques such as
1.—The addition of preservative chemicals such as benzoates
1.—The use of gaseous preservatives such as sulfur dioxide
1.—Vapor or liquid treatment with peroxygen compounds
1.—Peroxycarboxylic acids such as peracetic acid tend to have distinctive acrid aromas and tastes and if such chemicals were to be retained on foods exposed to them the flavors imparted may be distasteful All of these processes add significantly to the complexity and the cost of preserving the items for future use or consumption.

In addition to the above general disadvantages of the prior art some specific difficulties with the various technologies are as follows;

(i) With reference to the patent by Barbieri—he teaches a complex arrangement of valves and the selected mechanism for removal of ethylene oxide would also remove a substantial portion of the hydrogen peroxide used to disinfect the air in the chamber.

(ii) Vapor—requires the use of a vaporizer and all the peroxide solution is vaporized i.e. water and hydrogen peroxide or peroxycarboxylic acid, and a substantial quantity of liquid peroxide solution is used in the process which can lead to the retention of high levels of residual biocide or reaction byproducts on the materials being treated.

(iii) Liquid—a substantial volume of liquid peroxide solution is used in the process and bulk peroxide solution with significant concentration is retained on the surface of the products being disinfected, which can also lead to the retention of high levels of residual biocide or reaction byproducts on the materials being treated.

Another major disadvantage of the prior art with respect to application in cool rooms and the like is that high concentrations of peroxygen vapors will condense on the cold surfaces of the cool room and products therein. As a consequence, a handling hazard can be created which is both potentially injurious and difficult to remove.

The prior art describing the use of peroxygen or ozone in refrigerated spaces provides some benefits for the storage of putrescable items in the presence of hydrogen peroxide solutions, ice compositions and, oxidizing gases, they require, however, the direct application of said compositions to the items to be treated with significantly high concentrations of peroxide, other peroxygen compounds or ozone. These are potentially significant hazards in terms of product quality, occupational health and safety, materials compatibility and corrosion of storage equipment.

The prior art does not disclose or indicate in any way that the distribution of various concentrations of peroxygen formulations in a manner, which provides for a constant slow release of low levels (less than 10 mG/kG Air) of peroxygen vapor in a food storage area the growth of micro-organisms within the storage area will be retarded and beneficial results with regard to fresh food quality and shelf life are obtained.

TECHNICAL SOLUTION

Object of the Invention

It is an object of the present invention to provide a device and method for the continuous sanitization and deodorization of enclosed or semi-enclosed spaces, which creates significant advantages for the storage of putrescable items and avoids or ameliorates at least some of the disadvantages of the prior art.

It is a further object of preferred embodiments to perform said sanitization and deodorization at temperatures at or below 20 deg. C. and above −30 deg. C., more preferably at temperatures below 10 deg. C. and above −20 deg. C.

It is also an object of the invention that the fresh foods stored within the enclosed or semi-enclosed space should have their shelf life significantly extended.

It is also an object of the invention to provide a means for enhancing the availability of peroxygen vapor and optimizing the rate of its penetration into the space being treated above a reservoir of bulk peroxygen formulation, by use of suitable means to optimize the surface area to volume/mass ratio. Such means as an absorbent cloth, compatible surfactant, aerosol or rotating plate are some, but not an exhaustive list, of the means by which a large total available surface area can be provided to optimize the rate at which the peroxygen vapor/water vapor equilibrium is attained and maintained.

It is also an object of the invention that the bulk peroxygen solution never contacts the materials being treated within the enclosed or semi-enclosed space.

It is also an object of the invention to provide a simple effective and inexpensive method for sanitizing various spaces, which if left untreated result in spoiled food, contaminated waste and unpleasant odors around the untreated spaces.

ADVANTAGEOUS EFFECTS

Description of Drawings

Brief Description of the Drawings

Figure 1:
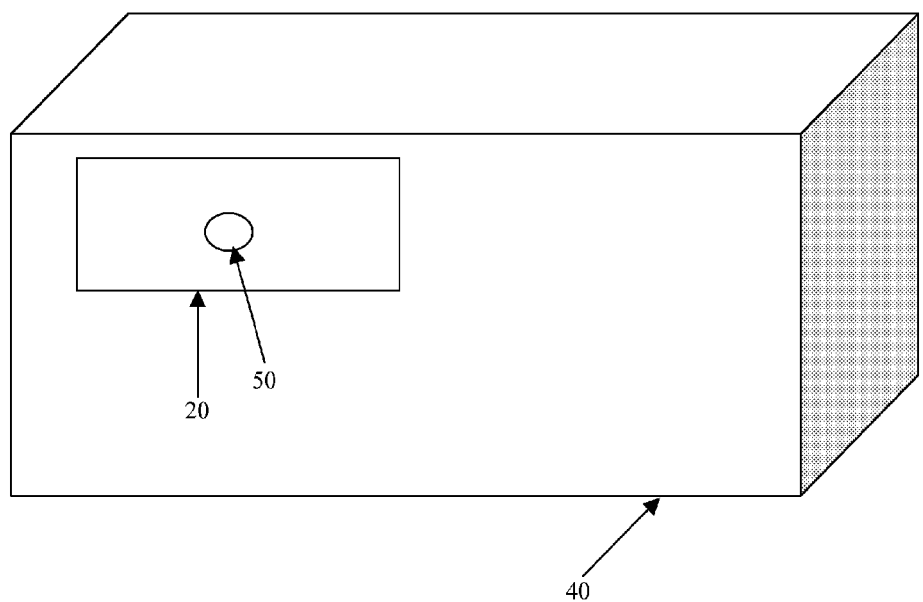

Description FIG. 1

Cloth 20 is contacted with peroxygen compound formulation 50, in sufficient quantity to treat the space, and placed in the treatment space 40.

Figure 2:
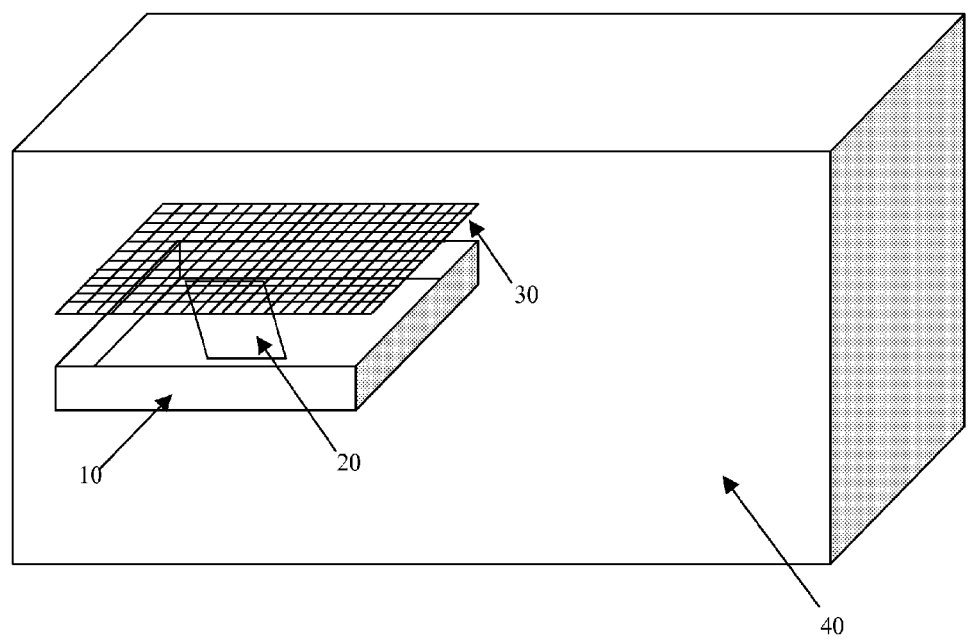

Description FIG. 2

Cloth 20 is contacted with a peroxygen compound formulation 50, in sufficient quantity to treat the space. The treated cloth 20 is placed in a tray 10 and a mesh cover 30 encloses the treated cloth 20 in the tray 10. This complete unit is placed in the treatment space 40.

Figure 3:
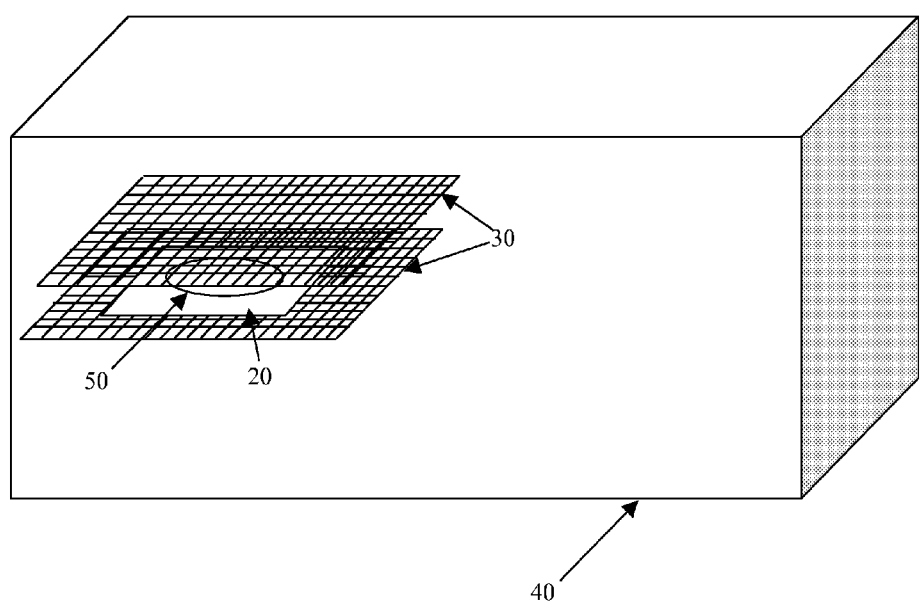

Description FIG. 3

Cloth 20 is contacted with a peroxygen compound formulation 50, in sufficient quantity to treat the space. The treated cloth 20 is sandwiched between 2 mesh covers 30. This complete unit is placed in the treatment space 40.

Figure 4:
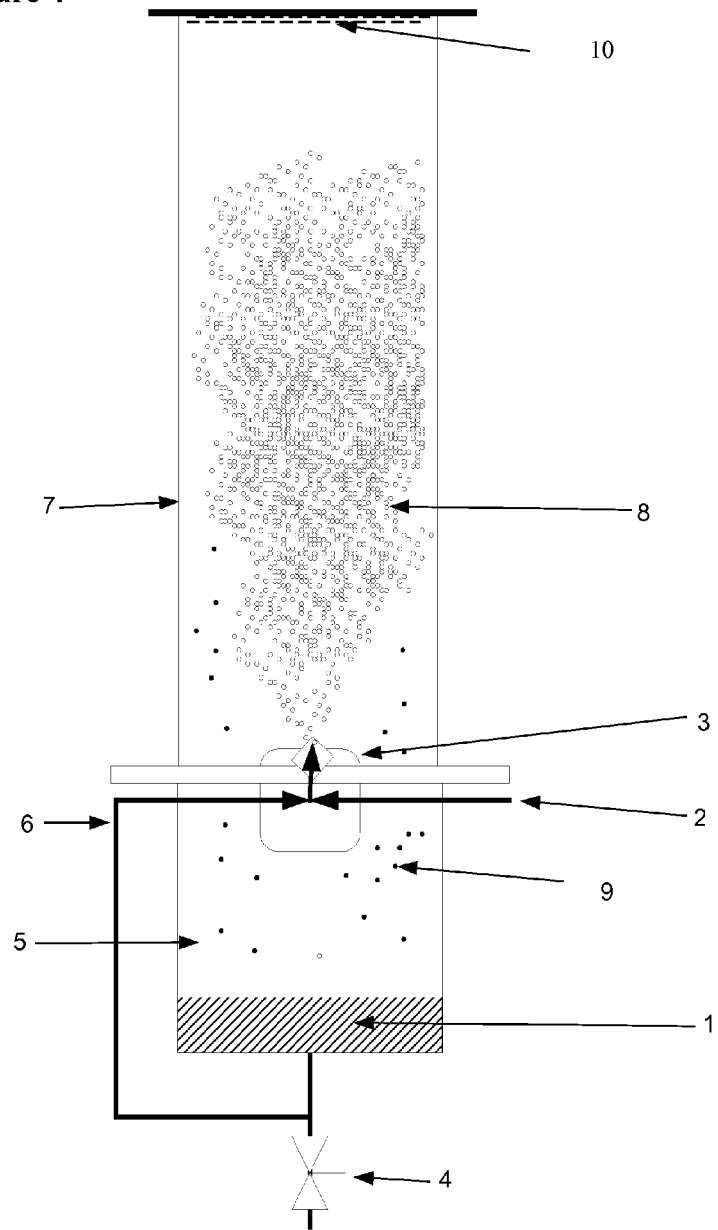
Figure 5:
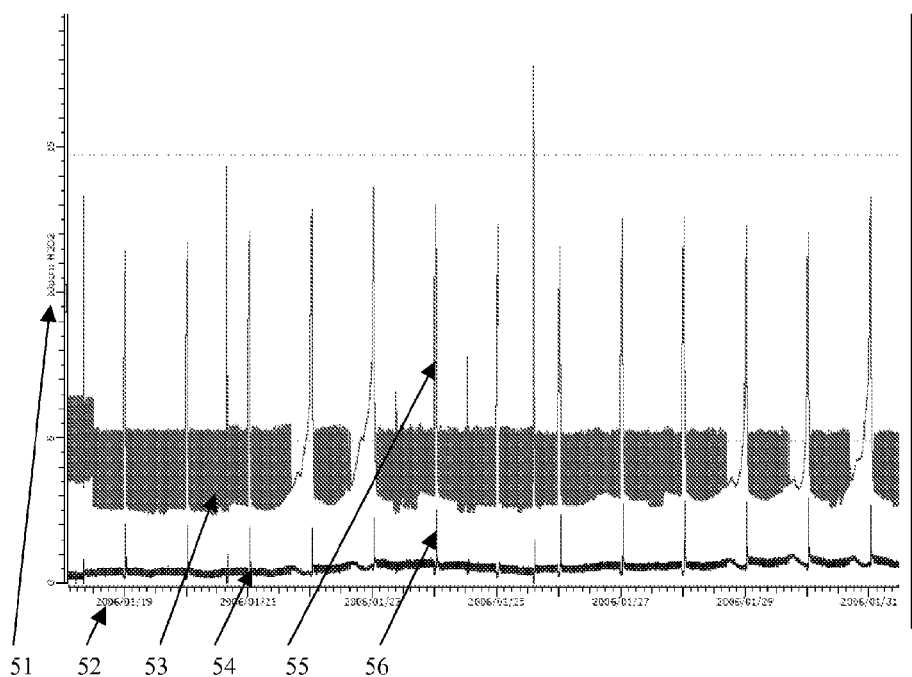

Description FIG. 4

A peroxygen formulation 1 is charged into a reservoir 5 through valve 4. Compressed air at a flow rate of 20 L/min and with a pressure less than 2 bar is applied to a proprietary venturi eductor. The peroxygen formulation is drawn from the reservoir into the venturi via the vacuum thus created and forms an aerosol plume 8 in the tube 7. The aerosol plume thus produced does not exceed 75% of the height of tube 7, and allows the aerosol droplets to coalesce and produce falling droplets 9, which return to the bulk solution 1 via gravity. The equilibrium peroxygen vapor so produced is conveyed without restriction though the mesh 10 into the surrounding space by the airflow introduced via 2 while mesh 10 acts as a coalescing barrier to the aerosol plume 8. At the end of a cycle any excess peroxygen formulation can be drained from the apparatus via valve 4.

Description FIG. 5

FIG. 5 shows a graph of the vapor concentration of hydrogen peroxide concentration (54) on the Y axis (51) against days on the X axis (52) recorded from readings made in a cool room with a Draeger Polytron II, equipped with a 0-50 ppm hydrogen peroxide sensor. The cool room was kept below 6° C., as shown by the recorded temperature trace (53), also referenced to the Y axis (51), and both readings were recorded for a period of more than 10 days. The peaks in temperature (55) and peroxide concentration (56) correspond to the daily defrost cycle or the opening and closing of the cool-room door.

At no time while the refrigerator unit was running did the peroxide concentration in the air exceed the 1 ppm Threshold Limit Value set by NIOSH for airborne hydrogen peroxide because of the limiting nature of its vapor pressure at these low temperatures.

BEST MODE

Description of Preferred Embodiments of the Invention

This invention can be embodied in a variety of ways. One preferred embodiment is to locate a reservoir of bulk solution, in a suitable vessel, of peroxygen formulation in the refrigerated treatment space at −20 deg. C. to 20 deg. C., preferably the concentration of peroxygen molecules in the formulation would be 0.5-50% by weight. More preferably the concentration of peroxygen in the reservoir would be 2-35% by weight. Most preferably the concentration of peroxygen in the reservoir would be 3-10% by weight.

Another preferred embodiment is depicted in FIG. 1 where the surface area of the peroxygen formulation is increased by absorbing a predetermined amount of peroxygen formulation 50 on to a Cloth 20, which has little or no interaction with the peroxygen formulation. This cloth is placed in the treatment chamber 40 at any temperature in the range −20 deg. C. to 20 deg. C.

Another preferred embodiment is depicted in FIG. 2 whereby the treated cloth 20 depicted in FIG. 1 is enclosed in a tray 10 with a perforated mesh cover 30 and the entire assembly is located appropriately within the treatment space 40 at any temperature in the range −20 deg. C. to 20 deg. C.

Another preferred embodiment is depicted in FIG. 3 whereby the treated cloth 20 depicted in FIG. 1 is sandwiched between 2 sheets of mesh 30 and the entire assembly is located appropriately within the treatment space 40 at any temperature in the range −20 deg. C. to 20 deg. C.

Yet another preferred embodiment is depicted in FIG. 4 whereby the available surface area of a reservoir of a peroxygen formulation is increased by the generation of an aerosol 8 formed within a tube 7. The compressed air used to produce the aerosol 8 carries the peroxygen molecules as vapor into the treatment space. Aerosol 8, which does not fully vaporize coalesces and forms droplets 9 in the tube returned via gravity to reservoir 1. The treatment chamber is preferably at a temperature of −20 deg. C. to 20 deg. C. and preferably, the concentration of peroxygen molecules in the formulation would be 0.5-50% by weight. More preferably the concentration of peroxygen in the reservoir would be 2-35% by weight. Most preferably the concentration of peroxygen in the reservoir would be 3-10% by weight.

MODE FOR INVENTION

Detailed Description of the Invention

This invention relies on the following scientific principles

1. The vapor pressure of a liquid or solid is a function of the material, the temperature of the system and is constant for any material at any given temperature.
2. The law of chemical equilibrium, as it applies to the equilibrium vapor concentration of peroxygen compounds.
3. The reaction of a peroxygen molecule, with itself, with an organism or with a malodorous chemical results in the conversion of the peroxygen molecule into other molecular species. For example, hydrogen peroxide naturally decays into water and oxygen. If the removal of peroxygen vapor is irreversible, then when a reservoir of bulk peroxygen compound is available, peroxygen destroyed in the vapor phase is replaced by peroxygen from the bulk formulation. By applying this principle to low temperature environments a constant supply of peroxygen vapor at low concentrations and very low vapor pressures (less than 10 Pascal) is provided to the chamber being treated. The surprising and unexpected result under these conditions being continuous sanitation and deodorization of the space, even though the actual peroxygen vapor concentration when the peroxygen molecule is hydrogen peroxide is less than 1 ppm as shown in FIG. 5.

To facilitate this invention it is essential the equilibration reaction (2) is optimized for the space to be treated. This is achieved by maximizing the air-liquid interface i.e. increasing the surface area of the peroxygen bulk solution.

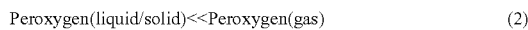

$$\text{Peroxygen(liquid/solid)} \ll \text{Peroxygen(gas)} \qquad (2)$$

Following are some examples of the application of this device. It is to be understood that these examples are an aid to understanding the application of the invention, and not a limitation on the scope or application of the invention.

Example 1

A restaurant was having difficulty keeping fresh herbs such as basil and coriander for longer than 3-4 days in its refrigerator. Initially a small vessel containing 5 ml of 50% hydrogen peroxide, with a surface area of 3 cm$^2$ was placed in the refrigerator and it was observed that the herbs kept in the space lasted for 6-7 days before deteriorating. This approach showed the benefits of hydrogen peroxide in sustaining the viability of herbs, but was impractical as high concentrations of peroxide in bulk form pose a significant hazard.

Example 2

Since the active component of the peroxide solution is the vaporous peroxide above the bulk solution an attempt was made to improve the vapor levels by using a readily available cleaning cloth ('Chux' Brand—non-woven synthetic), to which, was added 10 ml of 6% hydrogen peroxide. The cloth had an apparent surface area of 200 cm$^2$. Surprisingly, even with this low concentration of peroxide the herbs used by the restaurant lasted 8 days before deteriorating, and the odor of the refrigerator was significantly improved.

Example 3

One of the difficulties of placing a hydrogen peroxide impregnated cloth inside a refrigerator next to consumable foodstuffs is the peroxide can contact in full concentration the foodstuff, perhaps making it inedible. To overcome this problem a hydrogen peroxide impregnated cloth (containing 10 ml 6% hydrogen peroxide) was placed in the bottom of the refrigerator and covered with a plastic mesh. Even more surprisingly, this process enabled the herbs to be kept in good order for at least 10-14 days and the refrigerator stayed odor free for the entire period of 14 days In addition to the above one item (leek) was kept in the same refrigerator for over 30 days and was still fresh when removed.

Example 4

To confirm these observations some other experiments were performed in a microbiology laboratory whereby the movement of peroxide vapor throughout the fridge was monitored by the use of peroxide indicator strips A cloth impregnated with 8 ml of 3% hydrogen peroxide was placed in a refrigerator and on each of the shelves was placed a 'peroxide sensing' strip (Merckoquant 1.10011) with range of sensitivity of 0.5-25 mg/l $H_2O_2$.

As shown in Table 1 hydrogen peroxide was detected throughout the refrigerator when the peroxide sensing strips were examined 72 hours later. These results are only qualitative as the peroxide sensing strips are designed for immersion into a bulk solution, but they do demonstrate the effectiveness of the vaporous hydrogen peroxide above a bulk solution to penetrate all areas of the space being treated.

TABLE 1

| Shelf | Peroxide mg/L |
| --- | --- |
| Top | 2 |
| Middle | 2 |
| Bottom | 5 |

It would also be obvious to one skilled in the art that instead of relying on the London forces to disperse the hydrogen peroxide vapors, the inclusion of a fan or other air distribution technique would improve distribution of the vaporous hydrogen peroxide throughout the space being treated.

Example 5

In order to challenge the concept that sufficient hydrogen peroxide could be vaporised into a cold room to affect the microbial bioburden present at cold room temperatures, a trial was conducted in a cold room operated by a large pharmaceutical company.

The room was operated during the trial at 2-4 deg C. with the recirculation fan and refrigeration unit operating. After sealing the access door, 200 ml of 35% hydrogen peroxide was sprayed into the space using the apparatus described in FIG. 4 over a 2 hour period, followed by 8 hours standing before re-entry, to allow dissipation of the hydrogen peroxide.

The amount of hydrogen peroxide applied was well in excess of that required to saturate the space at the temperature.

Sterile Petri dishes were inoculated with the following pure cultures, as shown below and exposed at the geographical locations shown in Tables 2-4, horizontally vertically and under 20 liter carboys to observe biocidal penetration.

In each case the inoculum per Petri dish was 10 ul in 5% Horse Serum and AOAC Hard Water and then dried in a fan forced incubator at 37 deg. C.

After the room was opened, the exposed plates were recovered and cultured to detect residual growth with the following results;

TABLE 2

| *Pseudomonas aeruginosa* ATCC9027 | | | | | |
| --- | --- | --- | --- | --- | --- |
| Location | Orientation | 10$^{-1}$ Dilution | 10$^{-2}$ Dilution | Count/ml | Log Reduction |
| Control | | >300 | 150 | 1.5 × 10$^6$ | |
| RHS Top Shelf | Horizontal | No growth | No growth | | >6 |
| Under Bottle | Horizontal | 4 (contam.) | No growth | | >6 |
| Front Wall | Vertical | No growth | No growth | | >6 |

TABLE 2-continued

Pseudomonas aeruginosa ATCC9027

| Location | Orientation | $10^{-1}$ Dilution | $10^{-2}$ Dilution | Count/ml | Log Reduction |
|---|---|---|---|---|---|
| Rear Wall | Vertical | No growth | No growth | | >6 |
| LHS Top Shelf | Horizontal | 1 (contam.) | No growth | | >6 |
| LHS Wall | Vertical | No growth | No growth | | >6 |

TABLE 3

Cladosporium cladosporiodes FRR 4057

| Location | Orientation | $10^{-1}$ Dilution | $10^{-2}$ Dilution | Count/ml | Log Reduction |
|---|---|---|---|---|---|
| Control | | 55 | 2 | $5.5 \times 10^5$ | |
| RHS Top Shelf | Horizontal | No growth | No growth | | >5.5 |
| Under Bottle | Horizontal | No growth | No growth | | >5.5 |
| Front Wall | Vertical | No growth | No growth | | >5.5 |
| Rear Wall | Vertical | No growth | No growth | | >5.5 |
| LHS Top Shelf | Horizontal | No growth | No growth | | >5.5 |
| LHS Wall | Vertical | No growth | No growth | | >5.5 |

TABLE 4

Aspergillus niger FRR2522

| Location | Orientation | $10^{-1}$ Dilution | $10^{-2}$ Dilution | Count/ml | Log Reduction |
|---|---|---|---|---|---|
| Control | | >300 | 210 | $2.1 \times 10^6$ | |
| RHS Top Shelf | Horizontal | No growth | No growth | | >6 |
| Under Bottle | Horizontal | No growth | No growth | | >6 |
| Front Wall | Vertical | No growth | No growth | | >6 |
| Rear Wall | Vertical | No growth | No growth | | >6 |
| LHS Top Shelf | Horizontal | No growth | No growth | | >6 |
| LHS Wall | Vertical | No growth | No growth | | >6 |

From these data it was shown that psychrophilic organisms such *Pseudomonas* sp., which are renowned for colonising cold rooms and refrigerators where they can reproduce at refrigeration temperatures, were more than adequately disinfected, even though this organism is known to produce peroxidase.

The process similarly disinfected the environmental fungi *Aspergillus* sp. and *Cladosporium* sp.

No adverse effects were seen on the kills attained by this process irrespective of the geographical location or shielding employed by this trial.

Example 6

A large number of chicken carcasses were stored in an 8 cubic meter cool room well past their use by date, and the putrescent smell coming from these carcasses was overpowering. A cloth impregnated with 10 ml of 35% hydrogen peroxide was placed in a tray inside the cool room and within 24 hours the putrescent smell was removed and did not return for the, 2 week, duration of the experiment.

Example 7

Putrescent washings from chicken carcasses were stored in a freezer. The putrescent smell coming from the freezer was overpowering. A cloth impregnated with 10 ml of 35% hydrogen peroxide was place in a tray inside the freezer and extremely surprisingly, within 24 hours the putrescent smell was eliminated and did not return for the 3 week duration of the experiment.

The above examples describe a variety of situations in which the low temperature combined with the low vapor pressure of hydrogen peroxide above a formulated hydrogen peroxide solution, and dispersed in a manner which increases the total air/liquid interfacial surface provided substantial and beneficial outcomes with regard to the storage of fresh foods and the elimination of malodors from foods which are past their use by date and are becoming obnoxious to the senses.

It would be appreciated by one skilled in the art that;
1. The use of peroxygen compounds either directly or indirectly, as pre-curser chemicals for the production of hydrogen peroxide in situ, are within the scope of this invention.

2. The use of atmospheres other than air, such as nitrogen, oxygen, carbon dioxide, helium, vacuum etc. within refrigerated/air-conditioned spaces are within the scope of this invention.
3. The use of chemical adducts such as surfactants within the peroxygen formulation or for optimizing the liquid/air interfacial surface are within the scope of this invention
4. The use of suitable physical methods, other than the cloth described in the examples, such as; ceramic fibres, zeolites, spinning plates, flow evaporators, etc., for optimizing the liquid/air interfacial surface are within the scope of this invention
5. The use of circulatory equipment in addition to the fans associated with cool rooms or other treatment spaces to facilitate the distribution of peroxide vapors within the treatment space are within the scope of this invention.

Industrial Applicability
Sequence List Text

The invention claimed is:

1. A method for continuously sanitizing an enclosed or semi-enclosed space containing stored materials, wherein said method comprises;
   providing the space with a device comprising
   a reservoir of a bulk peroxygen solution absorbed onto an absorbent material selected from absorbent cloth, ceramic fibres and zeolites providing a surface area for slow release of less than 10 mG/kG air of peroxygen vapor to the space, and
   a barrier isolating the absorbent material from direct contact with the stored materials, wherein said barrier is permeable to peroxygen vapor;
   and wherein peroxygen vapor released from the absorbent material into the space does not exceed a concentration of 100 mg/m$^3$.

2. The method of claim 1 wherein the temperature in the space is in the range −20 deg. C. to 20 deg. C.

3. The method of claim 1 wherein hydrogen peroxide is the peroxygen compound in the peroxygen solution.

4. The method of claim 1 wherein peracetic acid is the peroxygen compound in the peroxygen solution.

5. The method of claim 1 wherein a peroxygen molecule other than hydrogen peroxide or peracetic acid are present in the peroxygen solution.

6. The method of claim 1 wherein the concentration of peroxygen vapor in the space does not exceed 10 mg/m3.

7. The method of claim 1 wherein a surfactant is added to the peroxygen solution.

8. The method of claim 1 wherein an atmosphere other than air is present in the space.

9. The method of claim 1 wherein an adduct other than a surfactants is added to the peroxygen solution.

10. The method of claim 1 wherein the stored materials are selected from foodstuffs and other putrescable items.

11. The method of claim 1 wherein the permeable barrier is made from a plastic or mesh which is substantially inert to the peroxygen solution.

12. The method of claim 1 wherein fans for air distribution are used in the space.

13. The method of claim 1 wherein the concentration of peroxygen vapor in the space does not exceed 1.0 mg/m$^3$.

* * * * *